United States Patent [19]

Sklar

[11] Patent Number: 4,733,752
[45] Date of Patent: Mar. 29, 1988

[54] EXTENSIBLE LADDER FOR BOATS

[76] Inventor: Robert Z. Sklar, 11321 SW. 49th Pl., Davie, Fla. 33330

[21] Appl. No.: 73,108

[22] Filed: Jul. 14, 1987

[51] Int. Cl.$^4$ .............................................. B60R 3/02
[52] U.S. Cl. ...................................... 182/86; 182/91; 182/95; 182/157; 280/166
[58] Field of Search ...................... 182/88, 91, 95, 156, 182/157, 86; 280/166

[56] References Cited

U.S. PATENT DOCUMENTS

| | | | |
|---|---|---|---|
| 877,363 | 1/1908 | Nielson | 182/157 X |
| 1,178,084 | 4/1916 | Lopez | 182/86 |
| 2,246,986 | 6/1941 | Pellegrini | 182/95 |
| 2,487,921 | 11/1949 | Culver | 280/166 |
| 2,575,615 | 11/1951 | Crump | 182/95 |
| 2,670,968 | 3/1954 | Duffy | 182/86 |
| 2,969,850 | 1/1961 | Hillis | 182/88 |
| 3,172,499 | 3/1965 | Stairs | 182/88 |
| 3,462,170 | 8/1969 | Smith et al. | 280/166 |
| 4,180,143 | 12/1979 | Clugston | 182/91 |
| 4,462,485 | 7/1984 | Terry et al. | 280/166 |
| 4,623,160 | 11/1986 | Trudell | 280/166 |

FOREIGN PATENT DOCUMENTS 129078  8/1950  Sweden ................................. 182/95

OTHER PUBLICATIONS

American Ladder Corp. "Stowaway Folding Boat Ladders", circular 1986.

Primary Examiner—Reinaldo P. Machado
Attorney, Agent, or Firm—Robert M. Schwartz; Allen B. Curtis

[57] ABSTRACT

Contractible and extensible ladder of the lazy-tong type for attachment to the underside of a swim/dive platform of a boat or to a deck of a boat. The ladder and the swim/dive platform or deck include coacting means so constructed for positioning the ladder in the contracted position under the swim/dive platform or deck for stowage thereof.

19 Claims, 9 Drawing Figures

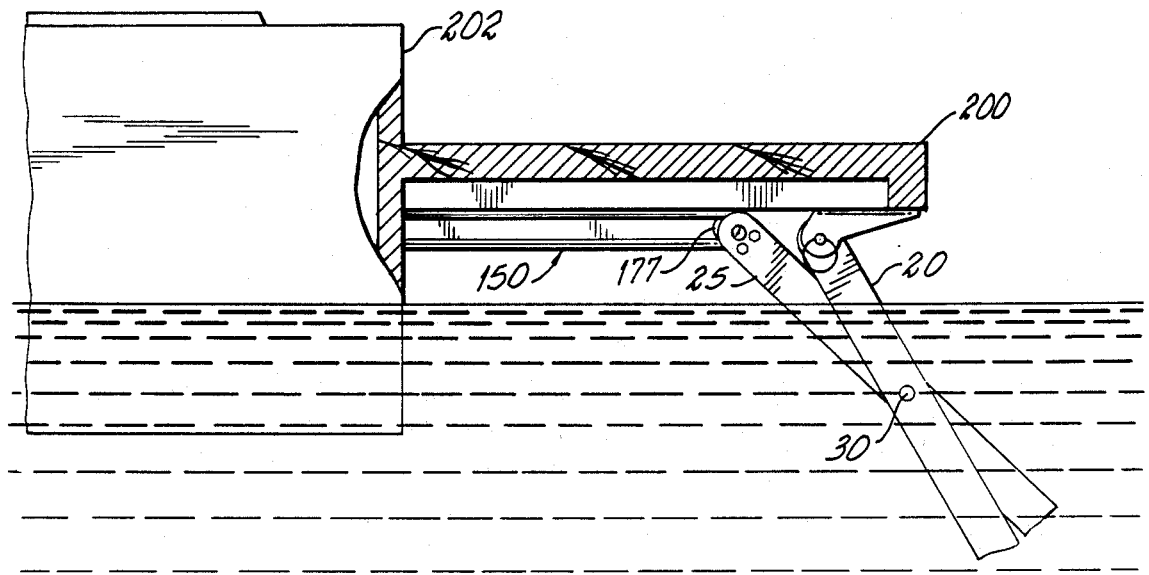
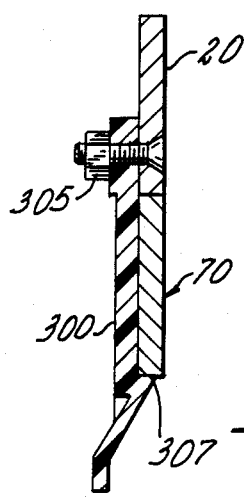
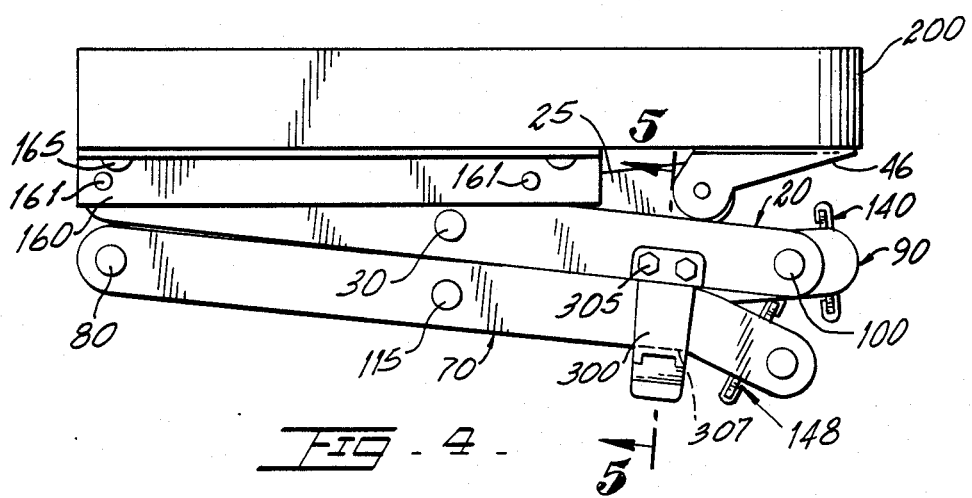

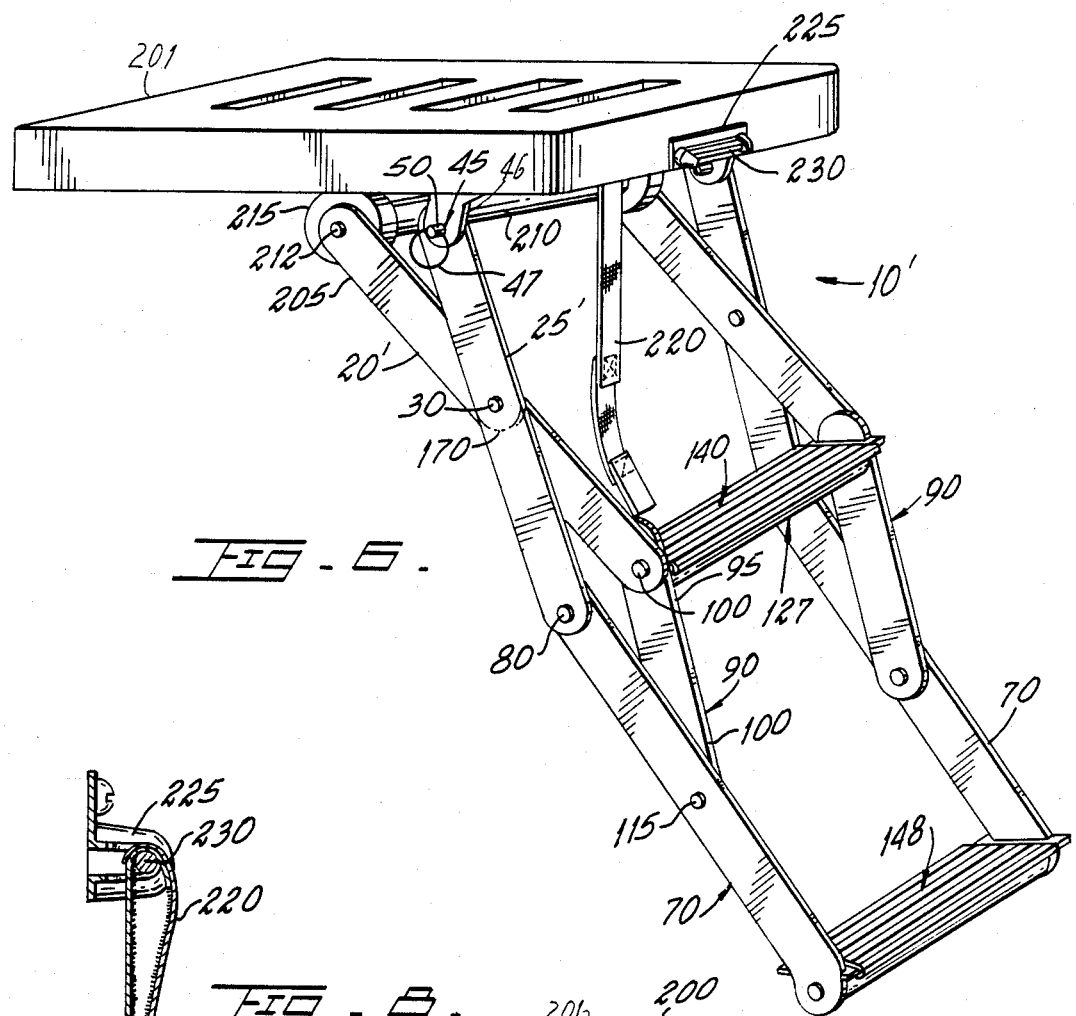
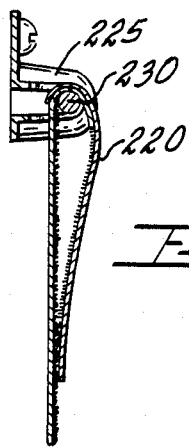
FIG. 6.
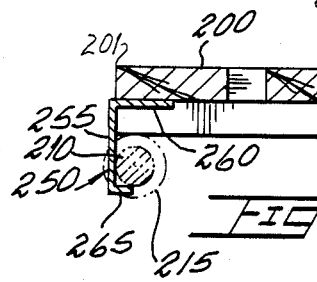
FIG. 8.
FIG. 6A.
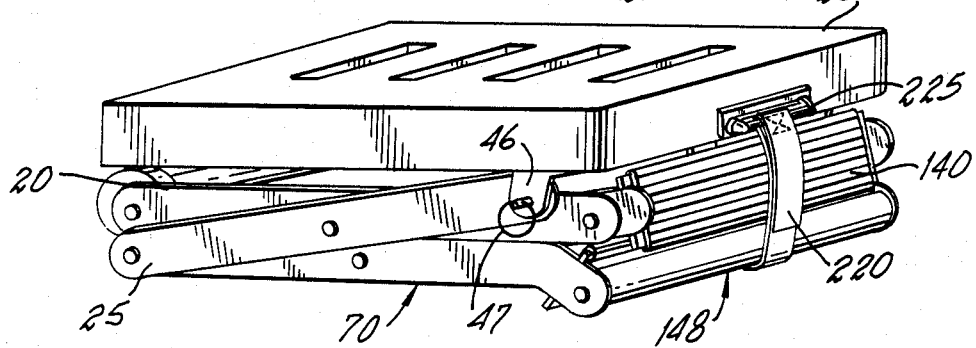
FIG. 7.

EXTENSIBLE LADDER FOR BOATS

BACKGROUND OF THE INVENTION

1. Field of the Invention

This invention relates to contractible foldable ladders of the lazy-tong type for use in an extended position, preferably in conjunction with a boat for facilitating egress of a person from the water and in a retracted position for compact stowage. More particularly, the ladder is so constructed for attachment to the underside of a swim/dive platform thereby permitting stowage thereunder.

2. Description of the Prior Art

Contractible lazy-tong ladders are well-known in the vehicular art as evidenced by the U.S. Pat. Nos. 2,575,615 to Crump, 2,969,850 to Hillis, 3,462,170 to Smith et al. and 4,623,160 to Trudell which disclose their use in the extended position for easy access to the interior of vehicles and in the contracted position for stowage; in the fire escape art as disclosed in U.S. Pat. No. 877,363 to Nielsen; and in the boat art by a publication published in 1986 by American Ladder Corporation of Ft. Lauderdale, FL. Although not disclosing a contractible ladder the U.S. Pat. No. 4,462,485 to Terry et al. discloses a boat having a swim/dive platform including a ladder secured to a hull wherein the ladder in the non-use position is mounted on the top surface of the platform.

SUMMARY OF THE INVENTION

In accordance with one aspect of this invention, there is provided an improved contractible ladder simplistic in construction unlike the above referred to prior art as it folds flat on an external surface of a boat.

In accordance with another aspect of this invention, there is provided a contractible ladder with simplistic design and construction that permits manual movement of the ladder in either the extended or contracted position without requiring mechanical means for changing its position.

In accordance with a still another aspect of this invention there is provided simplistic means for attaching and removing the ladder to a portion of a boat thereby facilitating quick attachment and removal of the ladder from the external surface of the boat.

In accordance with yet a still further aspect of the invention, there is provided a swim/dive platform with a contractible ladder constructed for mounting to the undersurface of the swim/dive platform for stowage thereunder thereby achieving concealment of the ladder.

In accordance with still yet another aspect of the invention, there is provided an extensible ladder structurally assembled for mounting on the undersurface of a swim/dive platform of a boat wherein the relationship of the ladder and the boat that the angle of orientation of the ladder with respect to the swim/dive platform is at least from about 45 degrees and preferably 60 degrees thereby facilitating egress of a swimmer from the water.

Still other aspects of the invention will become readily apparent to those skilled in the art in light of the following detailed description of the invention.

BRIEF DESCRIPTION OF THE DRAWINGS

One preferred embodiment of this invention is hereafter described with specific reference being made to the following figures in which:

FIG. 3 is a partial sectional side view of the ladder of FIG. 1;

FIG. 4 is a side perspective view of the contractible ladder shown in FIG. 1 in the stowed position illustrating latch means for maintaining the ladder in the stowed position;

FIG. 5 is a fragmentary sectional view of the latch means along lines 5—5 of FIG. 4

FIG. 6 is a side perspective view of another embodiment of the invention;

FIG. 6A is a fragmentary view illustrating an aspect of the invention;

FIG. 7 is a side perspective view of the contractible ladder shown in FIG. 8 in the stowed contracted position;

FIG. 8 is a fragmentary view of a modified means for retaining the ladder in its stowed contracted position.

DETAILED DESCRIPTION OF THE INVENTION

First and Preferred Embodiment of the Invention

Lazy-tong Ladder Construction

Figure 1:
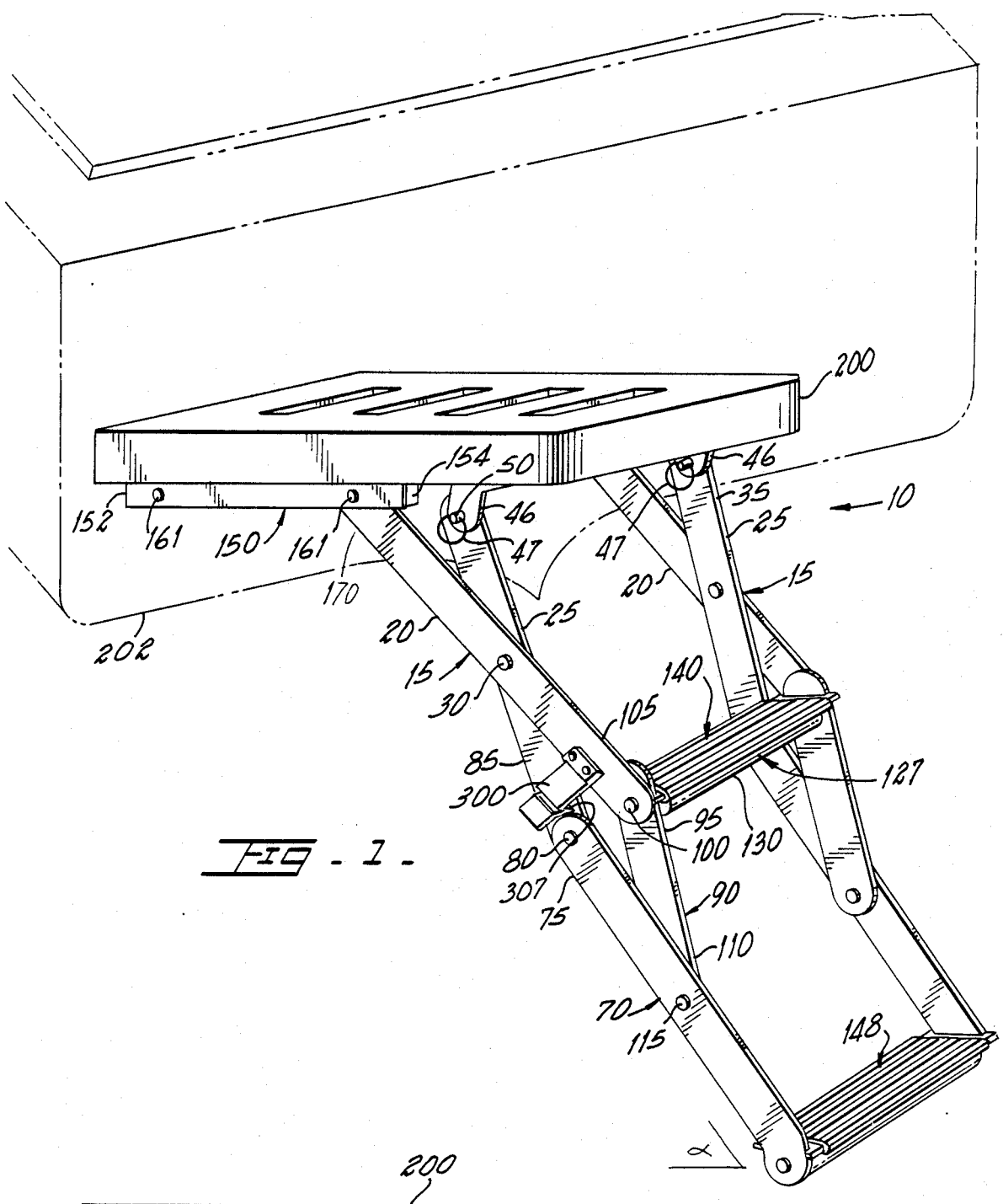
FIG. 1 is a side perspective view of a preferred embodiment of a lazy-tong contractible ladder of the invention in a fully extended position shown secured to a section of a boat or to the undersurface of a swim/dive platform.
Figure 2:
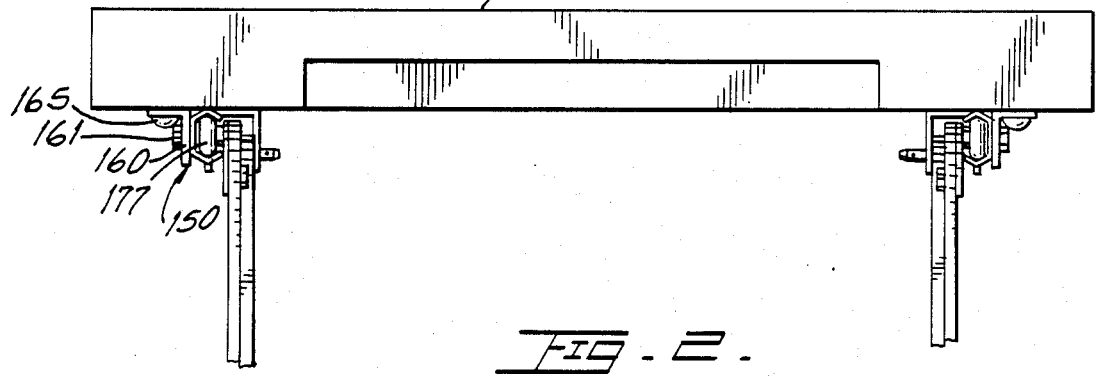
FIG. 2 is a fragmentary end view of the ladder of FIG. 1.

Referring now to the figures, FIG. 1 illustrates a retractable ladder generally indicated by the numeral 10. Ladder 10 includes a first pair of opposed parallel spaced linkages 15 wherein each of the spaced linkages 15 includes link bars or arms 20, 25 pivotally connected by first pivotal means 30. The pivotal means 30 is located intermediate of the length of bar 25 and 20 but is offset from the midpoint of bar 20.

Each end 35 of link bars 25 is removably and pivotally connected at second pivotal means 50 to U-shaped brackets 46 by manually removable means 50, for example, locking pins 50 as illustrated, or a nut and bolt assembly, wherein said means functions as the second pivotal means.

Pins 50 include bail means 47 for grasping by hand to facilitate removal thereof. Brackets 46 are secured to the undersurface of a swim/dive platform 200 by conventional means, e.g. nuts and bolts.

The ladder 10 includes a second pair of opposed spaced apart parallel linkages 70 having ends 75 pivotally connected by third pivotal means 80 to end 85 of link bars 25.

The ladder 10 includes a third pair of opposed spaced apart parallel linkages 90 or arms having one end 95 pivotally connected by fourth pivotal means 100 to end 105 of link bars 20 and having its other end 110 pivotally connected by fifth pivotal means 115 to the third pair of opposed linkages 70.

The distances of between fifth pivotal means 115 and third pivotal means 80 and fifth pivotal means 115 and fourth pivotal means 100 are for mechanical purposes substantially the same.

The first pair of linkages 10 are maintained in spaced apart relationship by rung means 127 including a shaft 130 having at each end thereof the fourth pivotal means 100. Shaft 130 includes tread means 140. The second pair of linkages are maintained in spaced apart relationship by rung means 148 similar in construction to rung means 127. The second pair of linkages 70 are maintained spaced apart by being connected to both the first and third linkages. The ratios of the distances of first pivotal means 30 and third pivotal 80; first pivotal means 30 and second pivotal means 50; and fourth pivotal means 100 and fifth pivotal means 115 are very important to achieve the toggle effect of the portions of linkages 20, 25 and 70, 90 at their pivotal points 80 and 100.

As illustrated in FIG. 1 the ladder is so structurally oriented with respect to a boat or swim/dive platform that the ladder in its extended position has an angle of inclination with respect to the horizontal, as represented by the symbol alpha, of approximately zero to ninety degrees, and preferably an angle of about 30 to 45 degrees thereby facilitating egress of a person from the water.

The term "swim/dive platform" as set forth in this specification includes within the scope thereof (1) a conventional swim/dive platform usually secured to the rear of a boat or as an integral part of a boat (2) a swim/dive platform secured to a deck of a boat and (3) the deck of a boat such as a pontoon boat.

As illustrated in FIGS. 4 and 7 the contractible ladder is shown in stowed or contracted position. The manner of connecting the various arms or links of the linkages as described above is also very important for additionally achieving compactness of the linkages in stowage position by having arms 20 and 70 parallel to each other and in contacting relationship in the contracted position.

Slidable Means for Engaging Boat Hull or Swim/Dive Platform Preferred Slidable Means Referring now to FIGS. 1 to 4, a pair of opposed parallel C-shaped channel members 150 which are open at one end 152 and optionally open or closed at its opposite end 154. Channel members 150 are secured to the bottom of surface member 200 by a flange 160 functionally secured by conventional means 161 with a side of of the channel member. Alternatively channel member 150 and flange 160 may be of a single member. The flange is secured to a swim/dive platform 200 by any conventional securing means 165 or is functionally integral with a boat 202.

Mounted on the end 170 of link bars 20 are rotatable bearing rollers 177 of a size slightly smaller than the inside height of channel members 150 and constructed for rotatable and translatable movement in the channel. The end 154 of the channel member may be closed to prevent removal of the link arm and rollers from the channel member. The channel member has an open end 152 for permitting manual entry and removal of the roller from the channel member.

In this embodiment the ladder is easily removed from its support 200 by removal of the pin 50 and manually moving the roller bearing out of the channel member via an open end.

Second Embodiment of Slidable Means

As shown in FIG. 6, each end 205 of link bars 20' is pivotally connected to a tubular shaft 210. Polygonally shaped free and unobstructed disk-like members, preferably cylindrical wheel-like elements 215, are fixedly or rotatably secured to the opposite ends of shaft 210 for translatable movement relative to and during contact with the underside of a swim/dive platform during contraction and extension of the ladder.

The first pair of linkages 20', 25' in this embodiment are maintained in spaced apart relationship by shaft 210 at one end and as above stated at the other end by rung means 127.

The link bars 20', 25' in the second embodiment are similar to link bars 20, 25 of the preferred embodiment differing in the overlapping arrangement of link bars 20', 25' wherein bar 25' is external to link bar 20' in the second embodiment whereas link bar 20 in the preferred embodiment is external to link bar 25.

Spaced a sufficient distance from U-shaped brackets 46 at end 201 of surface member 200 in the second embodiment is an L-shaped element 250 as illustrated in FIG. 6A including a vertical portion 255 of a length slightly greater than the diameter of wheel-like element 215, a horizontal portion 260 of about the same length of portion 255, and a third short portion or lip 265. Element 250 is secured to the underside of the swim/dive platform. This L-shaped element receives and accommodates shaft 210 in the contracted position of the ladder.

The pins 50 or similar securing means and U-shaped brackets 46 constitute the sole means in this embodiment for removably securing the ladder to surface 200.

Toggle Effect

The toggle effect, above mentioned, in conjunction with the spaced apart wheel-like elements is instrumental for applying pressure for maintaining the ladder in its extended position.

The various linkages 20',25' and 70,90 of ladder 10 in combination with the wheel-like elements 215 function similar to a cantilever system wherein torque pressure is being continually applied to the undersurface of a swim/dive platform.

Contractible Securing Means

The preferred means for maintaining the ladder in contracted position is, as illustrated in FIGS. 1, 4 and 5, resilient self-locking latch means 300 formed of Lexan TM (Trademark of General Electric Plastics Division) or some other polycarbonate having one end secured by any conventional means at 305 to link bar 20. The opposite end thereof includes a lip 307 for engaging the longitudinal edge of link bar 20 and overlaps link bar 70 thereby preventing extension of the link elements and movement thereof.

Other such means include a Velcro TM strap 220, as illustrated in FIGS. 6, 7 and 8, fixedly secured at one end of member 200 at the underside thereof functions in addition to the above organization of the various linkages and pivotal points for additionally maintaining the ladder in the contracted position, this being effected by passing strap 220 under rung means 148, then under bracket 225 including a rod 230 and then over the top of the bracket for contact with the opposite side of the Velcro TM strap.

In accordance with a modification of this invention where only a single step 140 is required, the end of link arm 25' can terminate just short of the first pivotal means 30 as shown by phantom line 170 in FIG. 6 with omission of elements 70, 90, and 148 and yet achieve the same advantages as expressed above.

However, should additional steps be desired it is evident that the number of lazy-tongs linkages may be increased.

EXAMPLE

The mathematical numerical values of the lengths of each link, the distances between the different pivotal means, the dimension of the slidable roll or wheel-like element are significant for obtaining a fully contracted ladder for stowage purposes wherein the link elements 20 and 70 are parallel to each other and to the underside of swim/dive platform 200.

The relative numerical values are set forth in the table below.

| Preferred Embodiment I | |
|---|---|
| length of link | inches |
| 20 | 13 |
| 25 | 11 & ½ |
| 70 | 13 |
| 90 | 7¾ |
| distance between pivots | |
| 30 & 161 | 6¼ |
| 30 & 50 | 4¾ |
| 30 & 80 | 6¼ |
| 30 & 100 | 6¼ |
| 100 & 115 | 6¼ |
| 80 & 115 | 6¼ |
| length of channel 150 | 9¾ |
| width of channel track | ¾ |
| diameter of roll wheel-like elements 215 | 1¾ |

It is readily apparent that variations or other modifications of this invention lie within the reach and capabilities of those skilled in the art without departing from the scope and spirit of the invention, as claimed.

I claim:

1. In a swim/dive platform having top and bottom surfaces and a ladder secured to a surface of said platform, the improvement wherein said ladder comprises at least one pair of opposed linkages, each of said pair of linkages including at least first and second elongated link elements, the first link element including first and second end portions and the second link element including third and fourth end portions, and a first pivotal means mounting said link elements for movement relative to each other, said first pivotal means disposed substantially midway of the length of the first element, at least a first support pivotally interconnecting said second end portions of each of the first of said pair of opposed linkages for maintaining said linkages in spaced apart relationship, translatable and slidable means secured to said first end portions of each of the first of said link elements, each of said second link element and the bottom of said platform including coacting means for pivotally securing said ladder to said platform, said platform and said ladder being so constructed for stowage of said ladder in the contracted position on the bottom surface of said platform.

2. In a boat including a swim/dive platform, the improvement wherein said swim/dive platform and said ladder are defined as set forth in claim 1.

3. In a swim/dive platform as set forth in claim 1, the improvement wherein said translatable and slidable means comprises a pair of spaced parallel channel means, roller bearing means rotatably and translatably supported in said channel, at least one of said channel means and said roller bearing means being secured to said bottom of said platform and to the first end portions of each of the first of said link elements, respectively.

4. In a swim/dive platform as set forth in claim 1 further including means pivotally interconnecting said first end portions of each of the first of said pair of opposed linkages for maintaining said linkages in spaced apart relationship, said translatable and slidable means including free and unobstructed means secured to said first support means and to the first end portion of each of the first of said link elements, said free and unobstructed means being of a larger dimension than the width of said first link element and of said means pivotally interconnecting said first end portions.

5. In a boat including a swim/dive platform, the improvement wherein said swim/dive platform and said ladder are defined as set forth in claim 4.

6. In a boat including a swim/dive platform, the improvement wherein said swim/dive platform is defined as set forth in claim 1.

7. A ladder as defined in claim 6 including means for maintaining the ladder in a contracted position.

8. A ladder as defined in claim 7 wherein said contracting means includes a resilient snap member secured to one of said link bars, said resilient member including means engaging another link bar for maintaining said link bars in locked contracted position.

9. A ladder comprising at least one pair of opposed linkages, each of said pair of linkages including at least first and second elongated link elements of different lengths, the first link element including first and second end portions and the second link element including third and fourth end portions, and a first pivotal means mounting said link elements for movement relative to each other, said first pivotal means disposed substantially midway of the length of the first element and offset from the midpoint of the length of the second element, at least a first support pivotally interconnecting said first end portions of each of the first of said pair of opposed linkages for maintaining said linkages in spaced apart relationship, free and unobstructed means secured to said first support means and to the first end portion of each of the first of said link elements, said free and unobstructed means being of a larger dimension than the width of said first link element and of said first support means, said second link element including a second means for pivotal attachment to a surface.

10. A ladder as set forth in claim 9 wherein said free and unobstructed means comprises circular means, and a third pivotal means pivotally connecting said first end portions of said first link element to said circular means.

11. A ladder as set forth in claim 8 further including a second pair of opposed spaced substantially parallel linkages, each of said linkages including at least one link bar, each of said link bars including fifth and sixth ends, a fourth pivotal means pivotally connecting the third ends of said second pair of link bars to the fifth ends of said second pair of linkages, and a third pair of opposed spaced substantially parallel linkages, each of said linkages including at least one link bar, each of said link bars including seventh and eighth ends, a fifth pivotal means pivotally connecting the seventh end of said link bar to the fourth end of said first linkages and a sixth pivotal means pivotally connecting the eighth end of said link bar to the link bars of said second pair of opposed linkages substantially midway of the length of said second pair of link bars, the linkages being so constructed and arranged with respect to each other that said linkages permit extension and contraction of said linkages, the ratios of the distances of first pivotal means and third pivotal means; first pivotal means and pivotal means supporting said wheel-like member, first pivotal means and third pivotal means; and fourth pivotal means and fifth pivotal means being so mathematically selected to effect a toggle action of portions of said linkages at their pivotal points which in conjunction with said wheel-like elements functions for applying sufficient continuous torque pressure for maintaining the ladder in an extended position.

12. A ladder including the linkage movement as set forth in claim 9 or 10 or 11 wherein the first interconnecting means is a shaft, said ladder including means mounting said circular means on said shaft in spaced apart relationship and second means interconnecting said second end portions, said second interconnecting means being so shaped to constitute a rung of the ladder.

13. A ladder as defined in claim 12 including means for maintaining the ladder in a contracted position.

14. A ladder as defined in claim 13 wherein said contracting means is a Velcro TM strap.

15. In a boat including a swim/dive platform and a ladder secured to said platform, the improvement wherein said ladder is recited as in claim 12 and further wherein said platform and the said first ends of the second link element include coacting means for removably securing the ladder to the underside of said platform, and means interconnecting said coacting means for securing the ladder to the underside of said platform.

16. In a boat as recited in claim 15 wherein said ladder is mounted on the underside of the swim/dive platform.

17. In a swim/dive platform as recited in claim 16 wherein said means for securing said ladder to said platform constitutes the sole means for securing said ladder to said platform.

18. In a swim/dive platform as recited in claim 17 wherein the bottom of said platform includes an elongated L-shaped member for receiving in the contracted position the shaft supporting said wheel-like elements.

19. A ladder as defined in claim 13 wherein said contracting means includes a resilient snap member secured to one of said link bars, said resilient member including means engaging another link bar for maintaining said link bars in locked contracted position.

* * * * *